(12) United States Patent
Yu

(10) Patent No.: US 6,826,041 B2
(45) Date of Patent: Nov. 30, 2004

(54) DYNAMIC ANGLE COMPUTER MONITOR

(76) Inventor: Sun Yu, 2850 Coolidge Hwy., Berkley, MI (US) 48072

( * ) Notice: Subject to any disclaimer, the term of this patent is extended or adjusted under 35 U.S.C. 154(b) by 0 days.

(21) Appl. No.: 10/266,153

(22) Filed: Oct. 7, 2002

(65) Prior Publication Data
US 2004/0066612 A1 Apr. 8, 2004

(51) Int. Cl.[7] ................................................ G06F 1/16
(52) U.S. Cl. ........................................ 361/682; 361/683
(58) Field of Search ......................... 361/679, 681–683, 361/686

(56) References Cited

U.S. PATENT DOCUMENTS

| 4,669,694 | A | 6/1987 | Malick ........................ 248/397 |
| 4,831,368 | A | 5/1989 | Masimo et al. .............. 340/720 |
| 5,016,849 | A | 5/1991 | Wu ............................. 248/183 |
| 5,268,816 | A | 12/1993 | Abell, Jr. et al. ........... 361/729 |
| 5,364,270 | A | 11/1994 | Aoyama et al. ............... 434/55 |
| 5,451,976 | A | 9/1995 | Ito ................................. 345/8 |
| 5,507,556 | A | 4/1996 | Dixon ...................... 297/217.3 |
| 5,589,849 | A | 12/1996 | Ditzik ......................... 345/126 |
| 5,715,138 | A | 2/1998 | Choi ........................... 361/681 |
| 5,812,368 | A | 9/1998 | Chen et al. .................. 361/681 |
| 6,076,784 | A | 6/2000 | Selker ......................... 248/118 |
| 6,288,891 | B1 | 9/2001 | Hasegawa et al. .......... 361/681 |
| 6,326,955 | B1 | 12/2001 | Ditzik ......................... 345/173 |
| 6,381,125 | B1 * | 4/2002 | Mizoguchi et al. ......... 361/682 |

FOREIGN PATENT DOCUMENTS

| JP | 04061764 | 3/1992 | ........... G06F/15/30 |
| JP | 07132212 | 5/1995 | ............. G06F/1/16 |

* cited by examiner

Primary Examiner—Yean-Hsi Chang
(74) Attorney, Agent, or Firm—Gifford, Krass, Groh, Sprinkle, Anderson & Citkowski, P.C.

(57) ABSTRACT

A dynamic angle computer monitor automatically adjusts the angle of a computer display relative to a supporting base. A drive element operates to urge the display through an angle relative to the base about an intermediate joint.

27 Claims, 5 Drawing Sheets

FIG - 2A
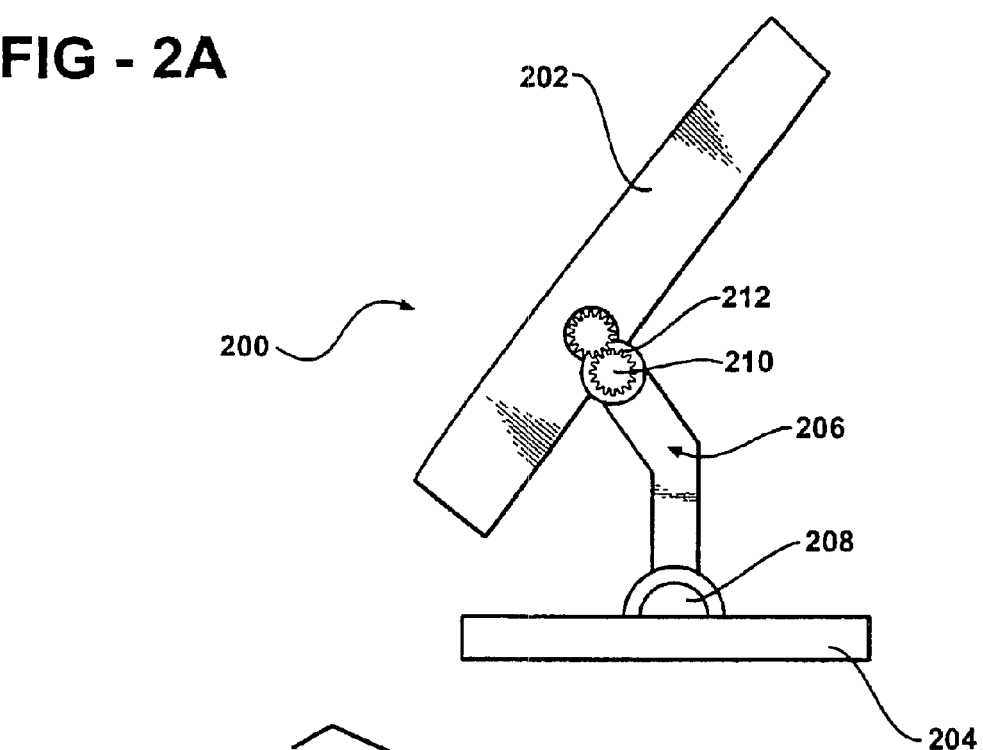
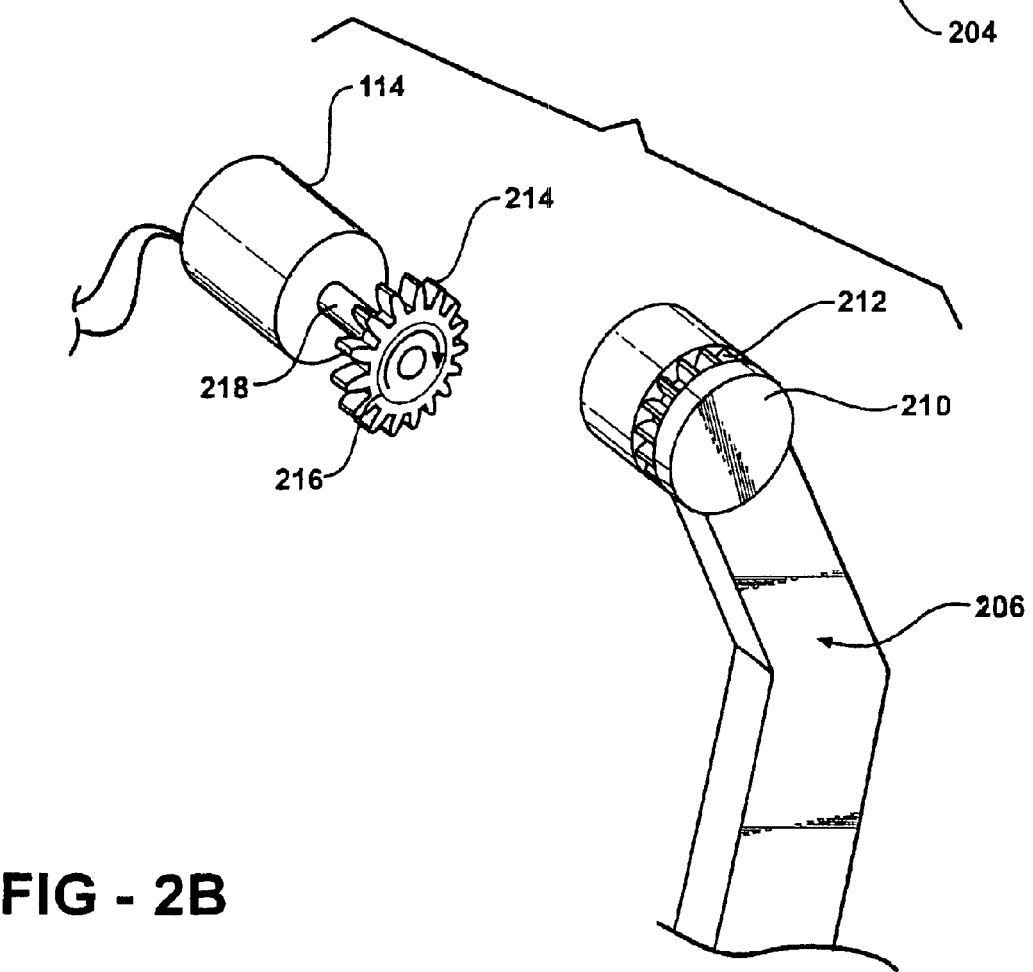
FIG - 2B

DYNAMIC ANGLE COMPUTER MONITOR

FIELD OF THE INVENTION

The present invention relates generally to an ergonomic computer monitor, and more specifically to a process and device affording automatic angular movement of the computer monitor.

BACKGROUND OF THE INVENTION

Computers have become an integral part of work and leisure for millions of individuals. In addition to the more widely recognized carpal tunnel syndrome, the fixed posture associated with viewing a computer terminal similarly induces a variety of repetitive stress type injuries. Injuries associated with static posture viewing of a computer terminal include neck and back strain, and headaches. The prior art has recognized the usefulness of a computer monitor that is readily adjusted relative to its base to achieve a desired viewing angle. Exemplary of monitor viewing adjustment devices include U.S. Pat. Nos. 5,812,638 and 5,589,849. However, the repetitive stress injuries associated with maintaining a fixed posture before a computer terminal has yet to be addressed. Thus, there exists a need for an ergonomic dynamic angle computer monitor.

SUMMARY OF THE INVENTION

A dynamic angle computer monitor includes a display supported by a base, with a joint intermediate between the display and the base, the joint having at least one angular movement degree of freedom. A drive element is secured to at least one of the aforementioned components and the operation of the drive element induces angular movement of the joint through a preselected angular movement rate.

A process for selectively controlling the viewing angle of a computer monitor includes energizing a drive element. A user input is then received with respect to the angular rate of change and total angular range to be circumscribed. A drive element is then engaged to urge a computer display to an angle relative to a supporting base.

BRIEF DESCRIPTION OF THE DRAWINGS

FIG. 2A is a partial cutaway side view of an embodiment of the present invention adapted for a hinge joint mounted computer terminal;

FIG. 2B is an exploded enlarged view of an inventive geared motor adapted to couple a mounting hinge joint;

DETAILED DESCRIPTION OF THE PREFERRED EMBODIMENTS

A computer monitor is provided that has a dynamic angle relative to a monitor base. A joint is intermediate between a computer monitor base and display. A drive element is anchored to a computer base, display, or joint and operates to induce angular movement of the joint through a preselected angular movement. In a preferred embodiment, an electronic processor is in communicative control of the drive element and operates through software loaded into an attached computer. The monitor angular movement mode is selected from a variety of forms including uniform, random, stepped, and periodic. The minor changes in computer monitor angle relative to a user appear to reduce user fatigue.

Figure 1A:
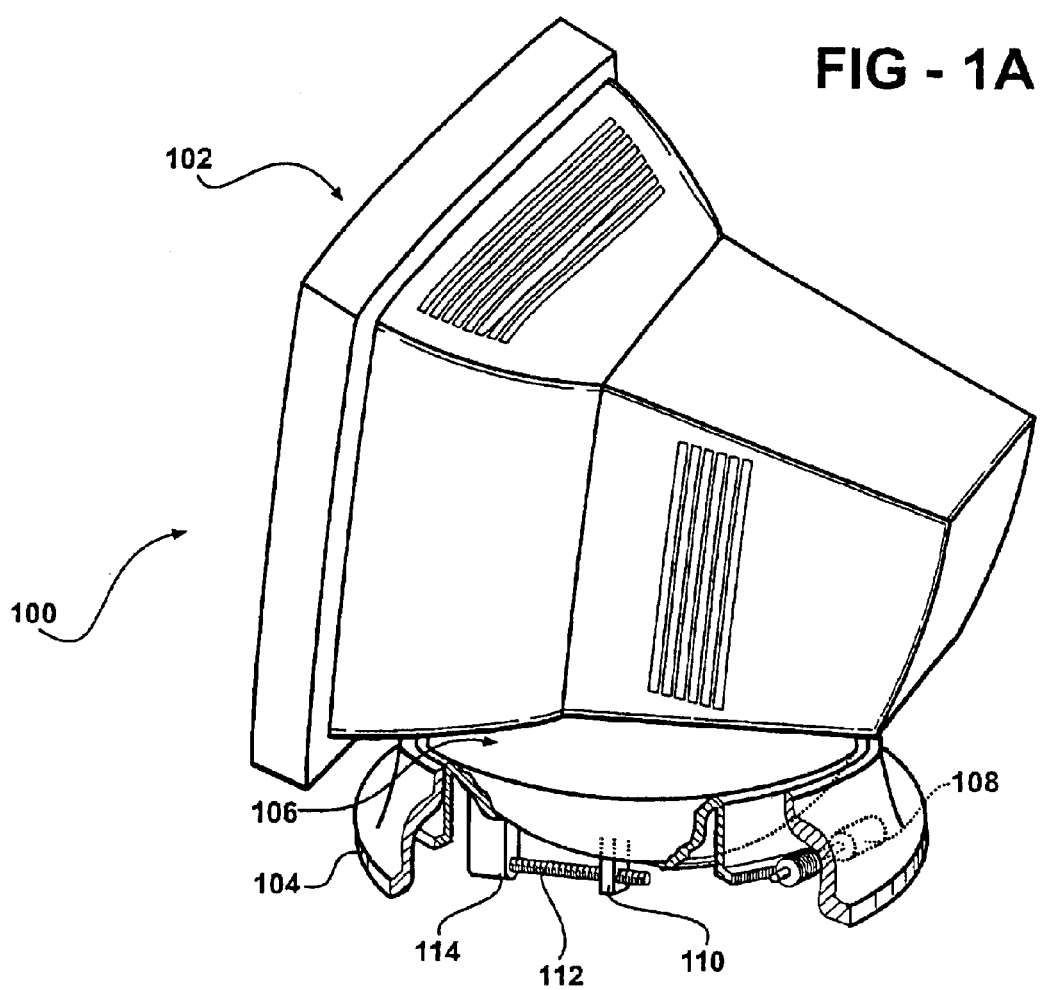
FIG. 1A illustrates a partial cutaway perspective view of the present invention operative with a ball joint pedestal.
Figure 1B:
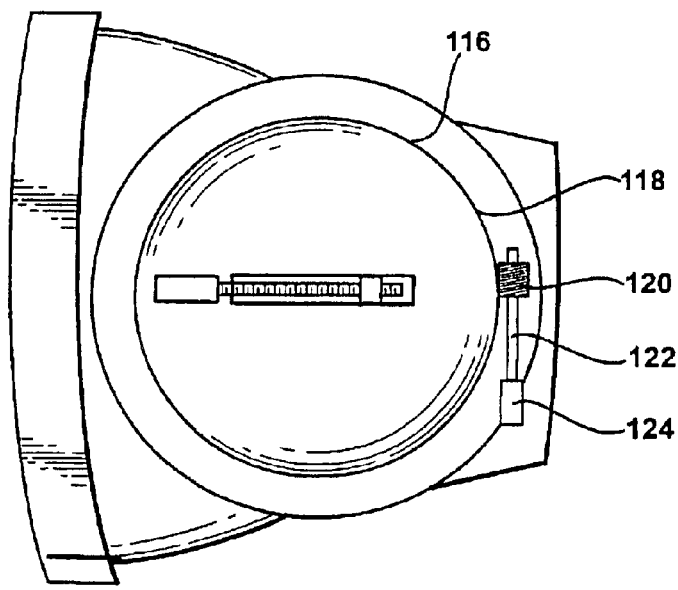
FIG. 1B illustrates a bottom view of the present invention depicted in FIG. 1A.
Figure 4:
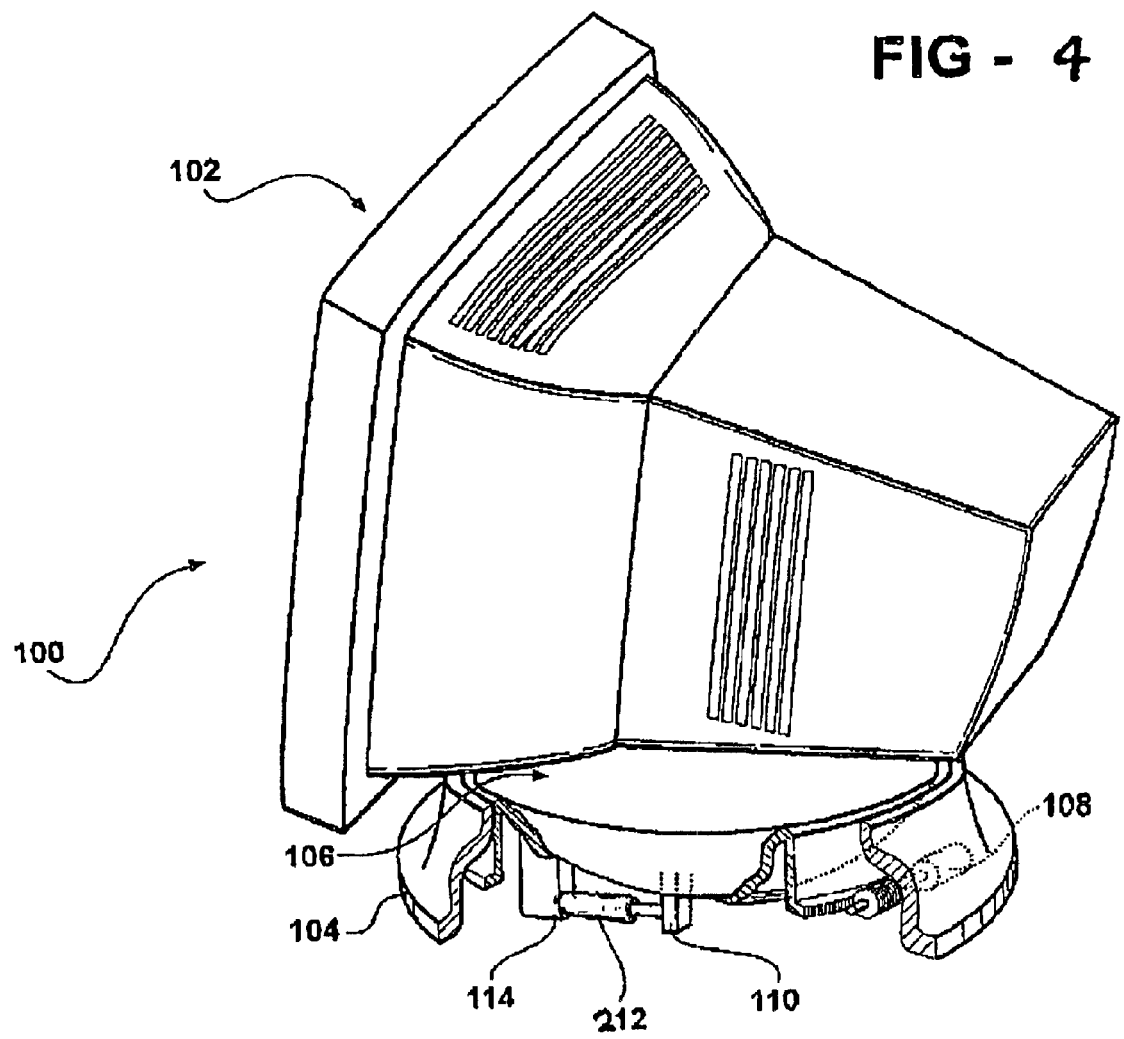
FIG. 4 illustrates the partial cut-away perspective view for an alternate inventive embodiment relative to FIG. 1A having a hydraulic cylinder drive element.
Figure 5:
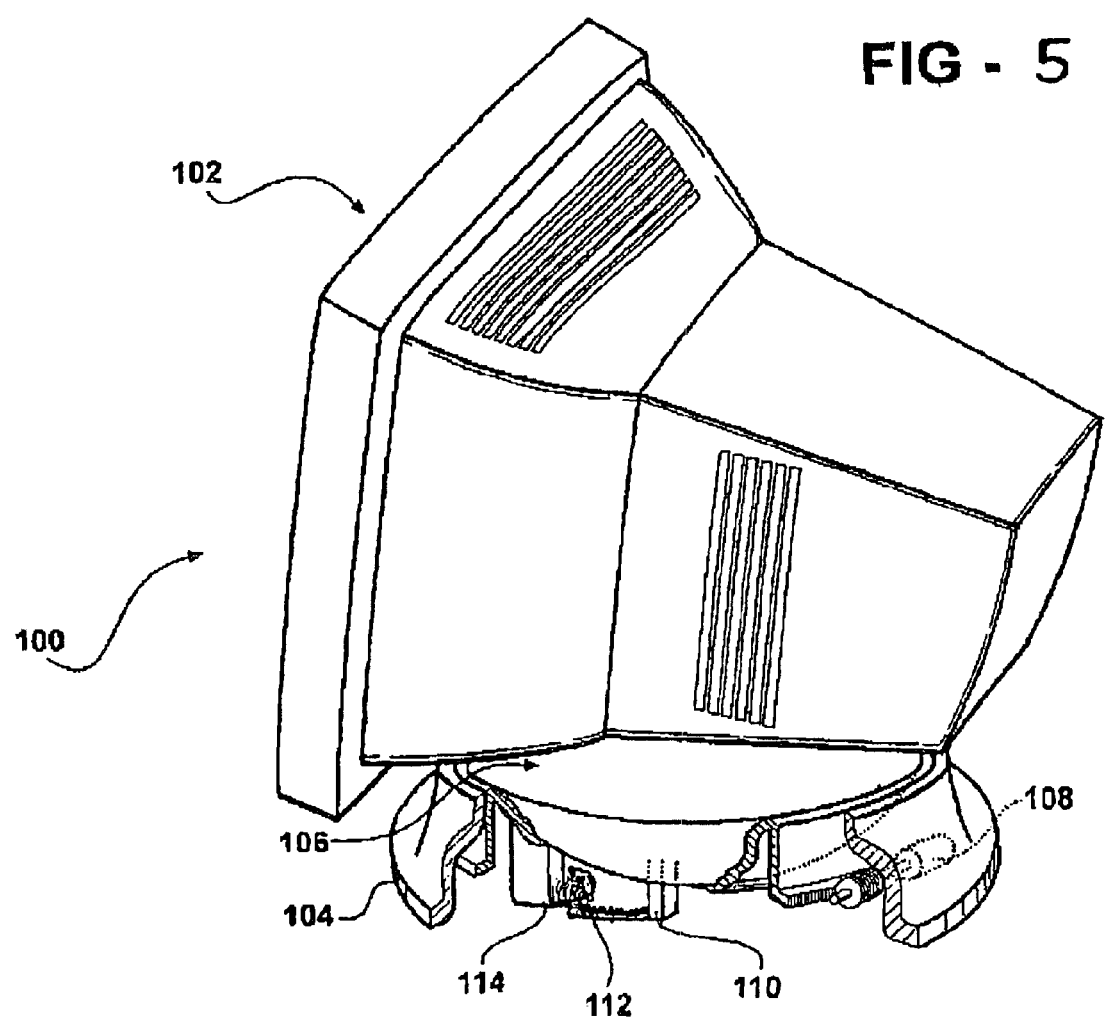
FIG. 5 illustrates the partial cut-away perspective view for an alternate inventive embodiment relative to FIG. 1A having a manual winding spring drive element.

FIG. 1 illustrates monitor 100 which is any computer monitor including cathode ray tube (CRT), liquid crystal, and plasma panel monitor displays. The monitor 100 has a display 102 and a supporting base 104. In the embodiment depicted in FIGS. 1A and 1B, the joint intermediate between the display 102 and the base 104 is a modified conventional ball joint 106. The ball joint 106 is secured to a mateable collar 108 of the base 104. Tn contrast to the prior art, a pivoting anchor nut 110 extends from the ball joint 106 and is adapted to receive a threaded rod 112. The threaded rod 112 is mechanically coupled to a drive motor 114. In the embodiment depicted in FIGS. 1A and 1B, the drive motor 114 is secured to the base 104. Activation of the drive motor 114 rotates the threaded rod 112, so as to urge the pivoting anchor nut 110 along the length of the threaded rod 112 thereby moving the display 102 relative to the base 104. It is appreciated that the relative position of the motor 114 on the base 104 and the pivoting anchor nut 110 on the ball joint are optionally reversed. A drive motor 114 is preferably a direct current electric motor energized through the conventional monitor power source. An exemplary direct current electric motor is TMC 2832A. While the present invention is depleted with a threaded rod and electric drive motor, it is appreciated that other conventional drive elements arc operative herein. Illustrative of the alternate drive elements to induce dynamic angular movement in a monitor include a hydraulic cylinder as shown in FIG. 4 at 212 and a manual winding spring as shown in FIG. 5 at 312. A spring operates in the present invention with a conventional sprocket and pawl so as to convert spring energy into linear motion along a rack gear (not shown).

In the embodiment depicted in FIGS. 1A and 1B, at least a portion of joint periphery 116 optionally has teeth 118 there along. The teeth 118 are adapted to engage a corresponding worm gear 120 riding on a threaded rod 122. The threaded rod 122 mechanically coupled to a drive motor 124. The drive motor 124 being secured to the base 104 of the monitor 100. It is appreciated that a circular gear coupled to drive motor 124 upon reorientation is capable of engaging the teeth 118 (not shown). As with the other drive element, it is appreciated that the drive motor and gearing are optionally supplanted by conventional drive mechanisms. With the inventive embodiment depicted in FIGS. 1A and 1B, activation of the drive motor 114 adjusts the vertical angle of the display 102 relative to the base 104 while activation of the drive motor 124 affects rotation of the display 102 relative to a vertical axis extending from the apex of the ball joint 106. An essentially vertical change in angle is preferred relative to a plane defined in the base. As used herein, "essentially" is intended to mean within 15° of a given angular position. It is appreciated that dynamic adjustment of either the vertical or rotational angle of the computer monitor display is sufficient to alleviate much of the continuous head and neck strain associated with computer usage. Further, it is appreciated that with suitable gearing and a clutch, a single drive element is selectively engaged to induce either vertical or rotational movement of the computer monitor display.

An electronic processor (not shown) includes motor controllers for drive motors 114 and 124. An inventive electronic processor is appreciated to be either an existing component of a computer or a distinct component integrated into either a computer monitor or computer and powered through conventional device power sources. The electronic processor preferably runs a program appearing on the display 102 that prompts a user to input monitor angular change rate and angular range. The program then prompts the user as to whether the angular rate change is to be uniform, random, stepped or periodic. The electronic processor thereafter activates each drive motor consistent with user inputs.

Referring now to FIGS. 2A and 2B, a monitor is shown generally at 200 having a display and a base 204. The display 202 is interconnected with the base 204 by way of a hinged arm 206. The hinged arm 206 conventionally has a basal terminal hinge 208 and an apical terminal hinge 210. At least one of the apical and basal terminal hinges has gear teeth 212. The gear teeth 212 adapted to enmesh similar teeth 214 of a gear 216 in mechanical communication with a shaft 218 extending from an electric drive motor 114, where like numerals in FIG. 2 correspond to the description of those elements given with respect to FIG. 1. While the drive motor and gearing are depicted in FIG. 2B as being present within the display and the apical terminal hinge, it is appreciated that a rotating drive motor is operatively secured to the hinged arm 206 enmeshing against a rack or other type of gear located within display 220 or base 204. Similarly, a drive motor 114 is anchored within the base 204 and enmeshes mateable gear teeth proximal to the basal terminal hinge 208.

Typically, the angular movement varies between 1 and 20°. Typical angular rates of movement are between 0.002 and 0.1per minute. Preferably, angular rates of movement are between 0.002 and 0.4°. More preferably, angular rates of movement are between 0.002 and 0.1°.

Figure 3:
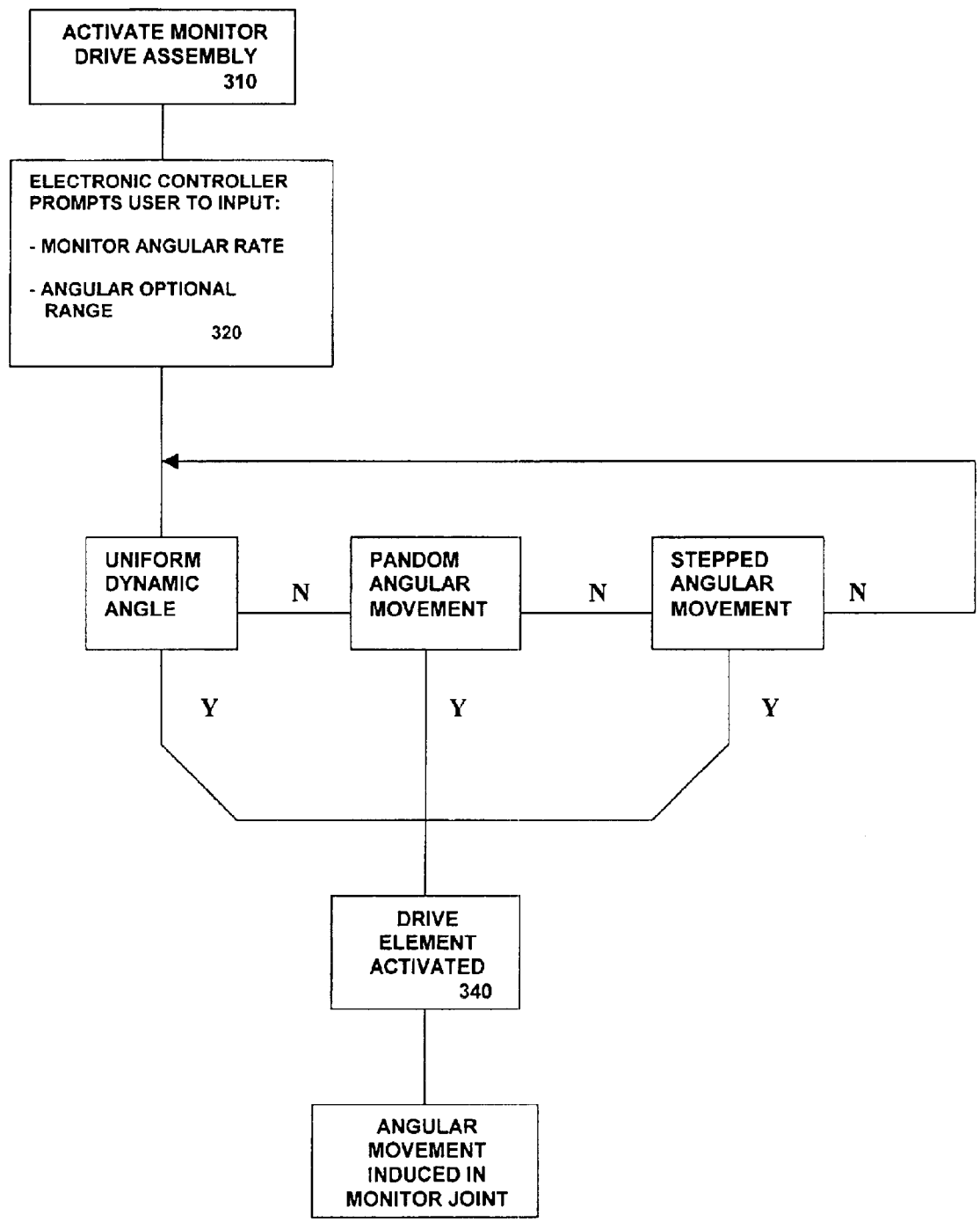
FIG. 3 is a flowchart schematic illustrating process steps of the present invention.

Referring now to FIG. 3, a process for selectively controlling the viewing angle of a computer monitor is shown generally at 300. A motor drive assembly is activated at 310. In the case of an electric drive motor, activation includes coupling the drive assembly to a voltage source. A hydraulic drive assembly is activated by pressurization and a spring by winding. In a preferred embodiment, an electronic controller prompts a user to input monitor angular rate of change and optionally the total angular range to be spanned 320. It is appreciated that upon reaching a predetermined angular range endpoint, the angle is optionally cycled back towards the origin angle. A user is further prompted in a preferred embodiment as to the form of angular change. A user selects between a variety of angular change waveforms collectively at 330. Illustrative rate change waveforms include uniform, random, stepped, and sinusoidal. It is appreciated that one skilled in the art will readily identify other suitable rate change waveforms that are operative herein. Upon selection of rate change waveform 330, the drive element is activated at 340 to initiate monitor angular change. As the drive element operates, angular movement is induced in a monitor joint to change the monitor display angle relative to the fixed base thereof.

Any patents or publications mentioned in the specification are indicative of the levels of those skilled in the art to which the invention pertains. These patents and publications are herein incorporated by reference to the same extent as if each individual patent or publication was specifically and individually indicated to be incorporated by reference.

One skilled in the art will readily appreciate that upon reading of the above description of the preferred embodiments of the invention that various changes in the shape, size and arrangements of parts may be resorted to without departing from the spirit of the invention or the scope of the appended claims. Specifically, it is appreciated that a variety of drive elements and controlling electronic processors and motor controllers are operative herein within the spirit of the above described invention.

What is claimed is:

1. A dynamic angle computer monitor comprising:
    a display;
    a base supporting said display;
    a joint intermediate between said display and said base, said joint having at least one degree of freedom of angular movement; and
    a drive element selected from a group consisting of a hydraulic cylinder and a manual winding spring secured to at least one component selected from the group consisting of said display, said base and said joint, said drive element operating to induce the angular movement of said joint through a preselected dynamic angular movement rate.

2. The monitor of claim 1 further comprising an electronic processor in communicative control of said drive element so as to move said joint.

3. The monitor of claim 1 wherein said joint is a ball joint.

4. The monitor of claim 1 wherein said joint is a hinge.

5. The monitor of claim 1 wherein said joint has two degrees of freedom.

6. The monitor of claim 1 further comprising a user input to adjust the preselected angular movement rate.

7. The monitor of claim 1 wherein the angular movement is between 1 and 20°.

8. The monitor of claim 1 wherein the angular movement is continuous.

9. The monitor of claim 1 wherein the angular movement is of a form selected from the group consisting of: uniform, random, stepped and periodic.

10. The monitor of claim 1 wherein the angular movement is essentially vertical relative to said base.

11. A dynamic angle computer monitor comprising:
    a display;
    a base supporting said display;
    a joint intermediate between said display and said base, said joint having at least one degree of freedom of angular movement;
    a drive element secured to at least one component selected from the group consisting of said display, said base and said joint, said drive element operating to induce the angular movement of said joint through a preselected dynamic angular movement rate;
    wherein the preselected angular movement rate is between 0.002 and 1° per minute.

12. The monitor of claim 11 wherein said drive element is an electric motor.

13. The monitor of claim 11 further comprising an electronic processor in communicative control of said drive element so as to move said joint.

14. The monitor of claim 11 wherein said joint is a ball joint.

15. The monitor of claim 11 wherein said joint is a hinge.

16. The monitor of claim 11 wherein said joint has two degrees of freedom.

17. The monitor of claim 11 further comprising a user input to adjust the preselected angular movement rate.

18. The monitor of claim 11 wherein the angular movement is between 1 and 20°.

19. The monitor of claim 11 wherein the angular movement is continuous.

20. The monitor of claim 11 wherein the angular movement is of a form selected from the group consisting of: uniform, random, stepped and periodic.

21. The monitor of claim 11 wherein the angular movement is essentially vertical relative to said base.

22. A process for selectively controlling the viewing angle of a computer monitor comprising the steps of:

receiving a user input of dynamic angular movement and angular range;

engaging a drive element to urge a display through an angle relative to a supporting base;

wherein the angular movement is between 0.002 and 1° per minute.

23. The process of claim 22 wherein the angular movement is continuous.

24. The process of claim 22 wherein the angle is essentially vertical relative to said base.

25. The process of claim 22 wherein the angular movement is of a form selected from the group consisting of: uniform, random, stepped and periodic.

26. The process of claim 22 wherein the angular range is between 1 and 20°.

27. The process of claim 22 further comprising the step of:

rotating the display on an essentially orthogonal axis to an axis defined by the angle.

* * * * *